United States Patent [19]

Date et al.

[11] 4,104,222

[45] Aug. 1, 1978

[54] DISPERSION OF LINEAR POLYESTER RESIN

[75] Inventors: Masakazu Date, Takatsuki; Masahiro Wada, Moriguchi, all of Japan

[73] Assignee: Toyo Boseki Kabushiki Kaisha, Japan

[21] Appl. No.: 441,990

[22] Filed: Feb. 13, 1974

[51] Int. Cl.$^2$ .................. C08J 3/06; C08G 63/50; D06M 15/10; D06M 15/68

[52] U.S. Cl. ................. 260/29.2 E; 8/115.6; 260/40 R; 260/33.2 R; 260/850; 428/265; 428/272; 428/480; 428/483; 428/524

[58] Field of Search ............... 260/29.2 E, 29.2 EP

[56] References Cited

U.S. PATENT DOCUMENTS

| | | | |
|---|---|---|---|
| 2,051,409 | 8/1936 | Kenney | 260/29.6 |
| 2,086,903 | 7/1937 | Ellis | 260/29.2 E |
| 2,334,107 | 11/1943 | Light | 260/29.2 E |
| 2,427,532 | 3/1944 | Miskel | 260/29.6 |
| 2,634,245 | 4/1953 | Arndt | 260/29.2 E |
| 2,809,948 | 7/1945 | Hunter et al. | 260/29.6 |
| 3,168,488 | 2/1965 | Sommer | 260/29.2 EP |
| 3,422,049 | 1/1969 | McClain | 260/29.6 |
| 3,457,206 | 7/1969 | Tonner | 260/29.2 EP |
| 3,557,039 | 1/1971 | McIntyre et al. | 260/29.2 EP |

FOREIGN PATENT DOCUMENTS

| | | | |
|---|---|---|---|
| 1,268,780 | 3/1972 | United Kingdom | 260/29.2 EP |

*Primary Examiner*—Murray Tillman
*Assistant Examiner*—A. H. Koeckert
*Attorney, Agent, or Firm*—Wenderoth, Lind & Ponack

[57] ABSTRACT

The present invention relates to a dispersion of a linear polyester resin for use in the property-improvement of shaped high polymer articles, said dispersion being obtained by mixing a linear polyester resin with a higher alcohol/ethylene oxide addition type surface-active agent, melting the mixture and dispersing the resulting melt by pouring it into an aqueous solution of an alkali under stirring. The dispersion may be used as coating or impregnating agents for shaped high molecular weight polymers.

4 Claims, No Drawings

DISPERSION OF LINEAR POLYESTER RESIN

The present invention relates to a dispersion of linear polyester resin and a method for the preparation of the same, and further to shaped high polymer articles treated therewith.

As methods for the dispersion of polymers, there are known a method which comprises dissolving a polymer and an emulsifier in an organic solvent and adding the resulting solution to water under stirring, and a method which comprises dissolving a high polymer in an organic solvent and adding the resulting solution to water containing an emulsifier under stirring and, if necessary, removing the organic solvent. However, by such methods, it is impossible to disperse a high molecular, crystalline polyester resin and obtain a stable dispersion, and no method for preparing a stable aqueous dispersion of polyester resin has been found up to the present.

An object of the present invention is to prepare a stable aqueous dispersion of linear polyester resin.

Another object of the present invention is to prepare a stable dispersion of linear polyester resin for use in the treatment of shaped high polymer articles.

The present invention comprises mixing a surface-active agent of the higher alcohol/ethylene oxide addition type with a linear polyester resin, melting the resulting mixture, and dispersing the melt by pouring it into an aqueous alkaline solution under stirring to obtain a stable dispersion of the linear polyester resin.

The linear polyester resins used in the present invention include those produced from an acid component selected from aromatic dicarboxylic acids such as terephthalic acid, isophthalic acid, etc., lower alkyl esters thereof, aliphatic dicarboxylic acids such as adipic acid, succinic acid, sebacic acid, dodecanedioic acid, maleic acid, etc., lower alkyl esters thereof; and an alcoholic component selected from straight chain glycols of 2 to 6 carbon atoms such as ethylene glycol, 1,4-butanediol, etc., branched glycols of 2 to 6 carbon atoms such as 1,2-propylene glycol, neopentyl glycol, 1,2-butanediol, etc., alkylene ether glycols of 2 to 6 carbon atoms such as diethylene glycol, triethylene glycol, polyethylene glycol, polypropylene glycol, polytetramethylene glycol, etc.; and linear polyester resins produced from an oxycarboxylic acid such as oxybenzoate. More specifically, there may be exemplified generally used linear polyester resins such as polyethylene terephthalate resin, polyethylene terephthalate/isophthalate resin, polyoxybenzoate resin, etc., and various modified linear polyester resins mainly composed of these resins; special linear polyester resins such as polyethylene terephthalate/polytetramethylene ether glycol block copolymer resin, ethylene terephthalate/ethylene sebacate random copolymer resin, polybutylene terephthalate/polytetramethylene ether glycol block copolymer resin, polyethylene tetraphthalate/polyethylene ether glycol block copolymer resin, terephthalic acid/sebacic acid/ethylene glycol/neopentyl glycol random copolymer resin, terephthalic acid/isophthalic acid/ethylene glycol/neopentyl glycol random copolymer resin, polyethylene terephthalate/ethylene isophthalate/polytetramethylene ether glycol block copolymer resin, polyethylene terephthalate/polytetramethylene adipate block copolymer resin, polyethylene terephthalate/polyethylene sebacate block copolymer resin, polyethylene terephthalate/polytetramethylene ether glycol/polyethylene ether glycol block copolymer resins, etc.

Among these linear polyester resins, those of low molecular weight are generally more easily dispersible, though those of high molecular weight such as having a molecular weight of 100,000 can be produced into a stable dispersion.

The surface-active agents of the higher alcohol/ethylene oxide addition type used in the present invention include ethylene oxide addition products of a higher alcohol, sorbitan monoacylate or alkyl phenol having an alkyl group of at least 8 carbon atoms, and propylene glycol/polyethylene glycol block copolymer, etc. More specifically, there may be exemplified polyoxyethylene lauryl ether, polyoxyethylene oleyl ether, polyoxyethylene stearyl ether, polyoxyethylene dodecylphenyl ether, polyoxyethylene octyl ether, polyoxyethylene nonylphenyl ether, etc.

The surface-active agents used in the present invention generally have a HLB value of at least 12, preferably 14 to 19. The amount of its use is generally 5 to 35 weight percent, preferably 20 to 30 weight percent, based on the weight of the linear polyester resin.

In the method of the present invention, a linear polyester resin and a surface-active agent and, if necessary, an anti-oxidant, are mixed together, and the mixture is melted in an inert gas atmosphere, preferably in nitrogen gas or argon gas, at a temperature above the melting point of the resin, preferably at a temperature between the melting point and 300° C., and the melt is added to a previously prepared aqueous alkaline solution bit by bit under stirring to disperse it. In this way, a stable milky white aqueous dispersion is prepared. The aqueous alkaline solution as referred to herein is an aqueous solution into which an inorganic or organic alkaline substance, preferably an alkanolamine in an amount of 0.2 to 5 weight percent and, if necessary, a small amount of a protective colloid have been dissolved. This alkaline solution is heated to a temperature, preferably, of 70° to 95° C. before the melted resin is added to the solution.

As the alkanolamines, there may be exemplified monoethanolamine, diethanolamine, triethanolamine, monomethylethanolamine, monoethylethanolamine, diethylethanolamine, propanolamine, butanolamine, pentanolamine, N-phenylethanolamine, alkylolamine of glycerine, etc.

While a clear account has not yet been given of the reason why high molecular, crystalline linear polyester resins can be dispersed, a possible supposition is that, when the high molecular linear polyester resin and the surface-active agent are mixed together, the resin causes ester exchange reaction with a part of the surface-active agent and is modified so that it is liable to emulsification, or the resin is thermally decomposed to some degree and the alkali is combined with the resulting carboxyl groups so that the dispersion is stabilized by electric repulsion. If a molecular weight decrease takes place in the linear polyester resin by hydrolysis caused by long-time heating and water content in the resin, the resin will of course become more emulsifiable, but the resulting resin will be of considerably different nature from the starting material linear polyester resin. Accordingly, depending on the kind of the starting material linear polyester resin as well as on the dispersing conditions, dispersions having different properties can be obtained.

The melting time is varied depending on the kind, shape and water content of the starting material linear polyester resin, the amount and water content of the surface-active agent, heating temperature, the rate of temperature rise, heating atmosphere, the use purposes of the dispersion, etc. However, the melting is generally carried out under conditions such that the emulsification is accomplished within 300 minutes, preferably within 60 minutes. If a dispersion having a lowered molecular weight is required, it is desirable that the starting material linear polyester resin contain 0.1 to 1 weight percent water.

The dispersions obtained by the method of the present invention are widely used as coating agents, impregnating agents for shaped high polymer articles such as paper, synthetic paper, fibers, non-woven fabrics, knitted and woven fabrics, films, boards, etc., depending on the kind of the starting material linear polyester resin and on the dispersing conditions. In general, dispersions of elastic polyester resins such as polyethylene terephthalate/polytetramethylene ether glycol block copolymer, polybutylene terephthalate/polytetramethylene ether glycol block copolymer, are used as sizing agents for yarn, paper, knitted articles, woven articles; as softeners in durable press processing and flame retardant processing of textile products; as agents for improving sewing properties, crease recovery, elastic recovery, stretching properties of textile products; as agents for preventing bagging, snagging of knitted articles; as anti-static agents for shaped high polymer articles; as adjuvants for water and oil repelling agents in water and oil repelling processing; and dispersion of polyester resins used mainly for adhering such as ethylene terephthalate/ethylene sebacate random copolymer resin, terephthalic acid/sebacic acid/ethylene glycol/neopentyl glycol random copolymer resin, are used as adhesives for shaped high polymer articles; as hard-finishing agents for textile products; as anti-slipping agents for knitted articles; as anti-pilling agents for woven articles; as binders for non-woven fabrics; and as fixing agents for dyes and pigments, anti-oxidants, anti-bacterial agents, perfumes, ultraviolet absorbers, etc. Also, dispersions of polyethylene terephthalate resin, polyethylene terephthalate/ethylene isophthalate resin, etc. are used as adhesives, fixing agents for dyes and pigments.

According to the method of the present invention, the starting material linear polyester resin may be used-up fiber waste or resin waste, and in addition the procedure is simple to carry out. Therefore, the method of the present invention has high economic merits.

The present invention is explained by examples in the following, in which all that are related with ratios are by weight.

EXAMPLE 1

Ten parts of a polyester/polyether block copolymer (molecular weight: about 65,000) consisting of 30 parts of polyethylene terephthalate segments and 70 parts of polytetramethylene ether glycol segments; and 2.5 parts of polyoxyethylene lauryl ether (HLB: about 17) were mixed, and melted at 250° C. in a nitrogen stream. The melted mixture was dispersed by pouring it into 90 parts of a previously prepared 1% aqueous solution of monoethanolamine at 90° C. under stirring. A white dispersion was obtained. This dispersion was stable on standing at ordinary temperatures (20° to 30° C.)

EXAMPLE 2

Twelve parts of a polyester/polyether block copolymer (molecular weight: about 60,000) consisting of 30 parts of polyethylene terephthalate/ethylene isophthalate segments (copolymerization ratio 80:20) and 70 parts of polytetramethylene ether glycol segments, and 2.5 parts of polyoxyethylene oleyl ether (HLB: about 19) were mixed and melted in a nitrogen stream at 280° C. On the other hand, 90 parts of a 0.5% aqueous solution of diethanolamine was heated to 80° C. The melt was then slowly added to the solution under stirring with a propeller stirrer. A stable milky white dispersion was obtained.

EXAMPLE 3

The parts of a polyester/polyether copolymer (molecular weight: about 60,000) consisting of 26 parts of polyethylene terephthalate/isophthalate segments (copolymerization ratio 95:5), 66.7 parts of polytetramethylene ether glycol segments and 7.3 parts of polyethylene glycol segments of a molecular weight of 2,000, and 2.5 parts of polyoxyethylene stearyl ether (number of added ethylene oxide mols: about 25) were mixed, and melted at 240° C. Separately, 87.5 parts of a 0.5% aqueous solution of ethanolamine was heated to 95° C. Upon pouring the polymer melt into the ethanolamine solution under stirring, a stable dispersion was obtained.

EXAMPLE 4

Ten parts of a polyester/polyether block copolymer (molecular weight: about 65,000) consisting of 26 parts of polyethylene terephthalate segments, 59 parts of polytetramethylene ether glycol segments and 15 parts of polyethylene glycol segments of a molecular weight of 400, and 2.0 parts of polyoxyethylene dodecylphenyl ether (HLB: about 16) were mixed, and melted at 250° C. Separately, 90 parts of a 1% aqueous solution of propanolamine was heated to 95° C. The melt was poured into the solution, and a milky white dispersion was obtained, which, after standing for two months, was stable without separating the polymer. For comparison, the same procedure was repeated except that, in place of polyoxyethylene dodecylphenyl ether, 1.0 to 3.0 parts of polyoxyethylene oleyl ester (HLB: about 18) was used. In this case, it was impossible to disperse the copolymer.

EXAMPLE 5

Fifteen parts of the polyester/polyether block copolymer used in Example 2, 3 parts of polyoxyethylene dodecylether (HLB: about 18), and 0.3 part of an antioxidant were melted at 260° C. The melt maintained at this temperature was poured into 130 parts of a 1% aqueous solution of monoethanolamine at 70° C. which was being stirred with a propeller stirrer, a stable aqueous dispersion was obtained.

EXAMPLE 6

Example 1 was repeated except for using a block copolymer consisting of polyethylene terephthalate segments and polytetramethylene adipate segments (copolymerization ratio 4:6; molecular weight: about 60,000). A stable aqueous dispersion was obtained. Example 1 was further repeated, however this time with the difference that a block copolymer consisting of polyethylene terephthalate segments and polycaprolactone segments (copolymerization ratio 4:6) was used. A stable aqueous dispersion was obtained also in this case.

EXAMPLE 7

One hundred parts of a block copolymer consisting of polyethylene terephthalate segments and polyethylene sebacate segments (copolymerization ratio 5:5; molecular weight: about 30,000) and 10 parts of polyoxyethylene lauryl ether (HLB: about 18) were mixed, and heated to 230° C. in a nitrogen stream. At this temperature, 10 parts of the above-mentioned polyoxyethylene lauryl ether was further added, and the mixture was melted for 5 minutes at this temperature. This mixed melt was poured into 880 parts of a 1% aqueous solution of methylmonoethanolamine at 80° C. under stirring, which was then cooled rapidly with cold water. The thus-obtained dispersion was very stable.

EXAMPLE 8

Seventy parts of dimethyl terephthalate, 30 parts of sebacic acid, 55 parts of ethylene glycol, and 45 parts of neopentyl glycol was random-copolymerized to form a transparent polymer having a limiting viscosity number of 0.7, a glass transition point of 5° C. and a melting point of 150° C. Thirty parts of this polymer and 8 parts of polyoxyethylene octyl ether (HLB: 17.0) were melted at 200° C. under stirring in a nitrogen stream. This mixed melt was slowly added dropwise into 62 parts of a 1% aqueous solution of monoethanolamine at room temperature under stirring. The dispersion thus obtained was translucent and had a viscosity of 10 cps. This dispersion did not separable after standing for more than one month.

EXAMPLE 9

Sixty parts of dimethyl terephthalate, 40 parts of dimethyl isophthalate, 55 parts of ethylene glycol and 45 parts of neopentyl glycol were random-polymerized and a soft polymer having a limiting viscosity number of 0.6 was obtained. Fifty parts of this polymer and 13 parts of polyoxyethylene octyl ether (HLB: 19) were melted in a nitrogen atmosphere at 230° C. This mixed melt was added dropwise into 37 parts of a 1% aqueous solution of triethanolamine, and a dispersion having a high viscosity of 150,000 cps was obtained.

EXAMPLE 10

One hundred parts of chips obtained from polyethylene terephthalate resin and 50 parts of polyoxyethylene lauryl ether (HLB: about 18) were mixed, and melted at 280° C. in a nitrogen stream for 10 minutes. This mixed melt was poured into 500 parts of a previously prepared 2% aqueous solution of triethanolamine at 85° C. under stirring, which was then cooled rapidly with cold water. Consequently, a stable dispersion was obtained. By dispersing polyethylene terephthalate fiber waste in the same way, a stable dispersion was obtained.

EXAMPLE 11

One hundred parts of a cation-dyeable polyester resin (S content: 0.4%) obtained by the copolymerization of polyethylene terephthalate and sodium 2,6-dicarboxybenzene-4-sulfonate and 30 parts of polyoxyethylene lauryl ether (HLB: about 18) were mixed, and the mixture was melted at 280° C. in a nitrogen stream. The resulting mixed melt was poured into 535 parts of a previously prepared 2% aqueous solution of ethylmonoethanolamine at 85° C. under stirring, which was then cooled rapidly with cold water. A milky white stable dispersion was obtained.

EXAMPLE 12

A jersey produced from polyester fibers was treated with a solution consisting of 10 parts of the dispersion obtained in Example 1 and 90 parts of water. The jersey, after being squeezed to a wet pick up of 50%, was dried at 100° C. for 4 minutes, and then treated at 170° C. for 7 minutes. The thus-obtained processed cloth was quite resilient; the crease recovery angle according to the Monsanto method was improved to 310° as contrasted to 270° of unprocessed cloth. The percent elastic recovery of elongation was also markedly improved.

EXAMPLE 13

A jersey produced from polyacrylonitrile fibers was treated with a solution consisting of 8 parts of the dispersion obtained in Example 2, one part of Aerotex Resin M-3 (a product of A.C.C.: trimethoxy methyl melamine), 0.2 part of Aerotex Accelerator ACX (a product of A.C.C.; organic aminehydrochloride) and 90.8 parts of water. The jersey was squeezed to a wet pick up of 80%, dried at 100° C. for 4 minutes and then heated at 140° C. for 2 minutes.

For comparison, the same procedure was repeated except for using 4 parts of a commercially available polyethylene emulsion (20%) in place of the dispersion of the present invention. Characteristic values of the treated cloths are compared in Table 1.

Table 1

| Sample | *Crease recovery angle (W + F) | **% elastic recovery of elongation | Touch |
|---|---|---|---|
| Untreated | 270° | 85% | — |
| Treated according to the present invention | 310° | 94% | Full |
| Comparative example | 280° | 80% | Stiff |

*The Monsanto method: Fed. Spec. CC-T-191b Method 5212.
**The cloth is elongated 50%, maintain in this elongated state for 5 minutes and then relaxed. After five minutes, percent recovery is measured.

The results show that the cloth treated with the dispersion of the present invention had an excellent crease recovery angle and percent elastic recovery of elongation, and had a full and resilient touch.

EXAMPLE 14

A tricot product from polyester filaments and a tricot composed of polyester/cotton (60/40) were each treated with the dispersion obtained in Example 1 and a commercially available polyethylene emulsion (20%), respectively. The sewing properties of these treated cloths were tested under the following conditions: Sewing thread: No. 60 count polyester filament; Number of rotation: 4000 r.p.m.; Number of stitches: 4 stitches/cm. As shown in Table 2, the results show that the cloths treated with the dispersion of the present invention were superior to those treated with the conventional polyethylene softener. Also, the former was found to be anti-static.

Table 2

| Tests for Sewing Properties | | |
|---|---|---|
| (After sewing, the thread was removed, and the number of the yarn of the cloth cut by the needle per 50 cm. was measured. Number of tests: n = 3) | | |
| | Polyester tricot | Polyester/cotton (60/40) tricot |
| Untreated | 20 | 6.2 |
| Dispersion of the present invention (0.5%) | 0.4 | — |
| The same (3.0%) | 0 | 0 |
| Polyethylene emulsion (0.5%) | 3 | — |

EXAMPLE 15

Treating solutions were prepared by adding, as softener, 2% or 5% of the dispersion obtained in Example 1, a commercially available polyethylene emulsion (20%) and a commercially available dimethyl polysiloxane emulsion (30%), respectively, to a durable press processing recipe consisting of 15% Permafresh DC (Reichold Co.; a DP processing agent) and 2% Catalyst F (Reichold Co.; a catalyst). A polyester/cotton (65/35) twill fabric (45/3 × 4/5)/(132 × 60) was treated with these treating solutions. The fabric was squeezed to a wet pick up of 50%, dried at 100° C. for 3 minutes, and then heated at 160° C. for 3 minutes. The thus processed fabric was tested for the penetration properties of a sewing machine needle under the following conditions: Stitch: lock stitch; Needle: No. 14; Number of rotation: 120 r.p.m. As shown in Table 3, the needle penetration resistance of the fabric treated with the dispersion of the present invention was equal or superior to that of the fabric treated with the conventional polyethylene or dimethyl polysiloxane softener. Furthermore, its soil resistance (soil prevention and soil removal) was extremely good.

Table 3

| Auxiliary used together | Needle penetration resistance and soil resistance of the treated fabrics. | | |
|---|---|---|---|
| | Needle penetration resistance | Soil resistance | Touch |
| None (blank) | 1750 g. | — | Poor |
| Dispersion of Example 1 (2%) | 1350 g. | Improved | Good |
| Dispersion of Example 1 (5%) | 800 g. | Improved | Good |
| Polyethylene emulsion (2%) | 800 g. | Worsened | Poor |
| Dimethyl polysiloxane emulsion (2%) | 1300 g. | Unchanged | Poor |

EXAMPLE 16

A polyester/cotton reverse half tricot and a rayon curtain fabric were immersed into a treated solution containing 20% monomethyloldicyandiamide, 5% 85%-phosphoric acid, squeezed to a wet pick up of 70%, dried at 100° C. for 4 minutes and then heated at 150° C. for 3 minutes. Each of the fabrics was divided into three pieces. The first piece was left untreated, the second piece was treated with the dispersion obtained in Example 4, and the third was treated with an aqueous solution of commercially available dimethyl polysiloxane (30%). They were squeezed to a wet pick up of 70% and were dried at 80° C. for 5 minutes. The fabrics aftertreated with the dispersion of Example 4 were improved in trearing strength and softness, without being impaired in flame retardancy.

Table 4

| | Polyester/cotton reverse half tricot | | Rayon curtain | | |
|---|---|---|---|---|---|
| | LOI[1] | Handle-0-Meter[2] | LOI[1] | Hardness[3] | Tearing strength[4] |
| Dispersion of Ex. 4 (3%) | 25.5 | 34 | 28.5 | 45 | 3050 g. |
| Dimethyl polysiloxane emulsion (1%) | 24.0 | 40 | 26.8 | 46 | 2500 g. |
| Without aftertreatment | 25.0 | 60 | 29.0 | 56 | 1500 g. |

[1]Limiting Oxygen Index.
[2]Measured with the Handle-O-Meter of Swing Albert Instrument Co., after its Catalogue No. 221-2.
[3]Projected length according to the cantilever method.
[4]After the Elemendorf method.

EXAMPLE 17

A knitted fabric produced from textured polyester yarn was treated with a solution composed of 10 parts of the dispersion obtained in Example 3 and 90 parts of water. The fabric was squeezed to a wet pick up of 60%, dried at 100° C. for 3 minutes and then heated at 160° C. for 2 minutes. The thus-treated fabric had excellent resilience and good anti-staticity.

EXAMPLE 18

A mock milano rib knitted fabric produced from polyester textured yarn was immersed into a solution composed of 3 parts of the dispersion of Example 8 and 97 parts of water. The fabric was squeezed to a wet pick up of 60%, dried at 80° C. for 5 minutes and then subjected to a setting step at 160° C. for 1 minute. For comparison, a control knitted fabric immersed in water and otherwise subjected to the same operation, was prepared. Slacks were sewed with the two knitted fabrics on the left and right. After two months of wearing, less snags and pills took place on the part treated with the polyester copolymer dispersion of the present invention. It is supposed that this resulted from the copolymer polyester causing adherance to the intersections of the polyester yarn.

EXAMPLE 19

A polyester filament twill fabric (2300d/48f × 250d/48f)/(170 × 57) was immersed into a solution composed of 5 parts of the dispersion of Example 9 and 95 parts of water. The fabric was squeezed to a wet pick up of 70%, dried at 100° C. for 4 minutes and then heated at 150° C. for 1 minute. Safety caps for children were sewed from the twill fabric treated with the dispersion of the present invention and the same fabric which was not treated. Upon shaping them on a shaping frame, the untreated ones were frayed but the treated ones were not.

EXAMPLE 20

The dispersion obtained in Example 10, to which a pigment was added, was used as a paint on a polyester film poster. Its adherence to the film after drying was very good and the pattern letters on it were not easily washed off with water.

What is claimed is:

1. A dispersion of a linear polyester resin for use in improving the properties of shaped high polymer articles, said dispersion being obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70°-95° C, said alkanolamine being selected from the group consisting of monoethanolamine, diethanolamine, triethanolamine, monomethylethanolamine, monoethylethanolamine, diethylethanolamine, propanolamine, butanolamine, pentanolamine, N-phenylethanolamine, and an alkylolamine of glycerine, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12.

2. A dispersion as claimed in claim 1 wherein the linear polyester resin is obtained by the polycondensation reaction of an aromatic dicarboxylic acid and/or an aliphatic dicarboxylic acid or a lower alkyl ester thereof with a lower alkylene glycol and/or polyalkylene glycol.

3. A dispersion of a linear polyester resin as claimed in claim 1 wherein the mixture of the linear polyester resin and the surface-active agent is melted at a temperature between the melting point of the resin and 300° C. in an inert gas atmosphere.

4. A dispersion as claimed in claim 1, wherein the surface-active agent is used in an amount of 5–35 weight percent, based on the weight of the linear polyester resin.

* * * * *